(12) United States Patent
Mannss

(10) Patent No.: US 6,819,485 B2
(45) Date of Patent: Nov. 16, 2004

(54) OPTICAL VIEWING DEVICE

(75) Inventor: Juergen Mannss, Oberdiessbach (CH)

(73) Assignee: Leica Microsystems (Switzerland) AG, Heerburg (CH)

( * ) Notice: Subject to any disclaimer, the term of this patent is extended or adjusted under 35 U.S.C. 154(b) by 278 days.

(21) Appl. No.: 10/023,844

(22) Filed: Dec. 21, 2001

(65) Prior Publication Data

US 2002/0080478 A1 Jun. 27, 2002

(30) Foreign Application Priority Data

Dec. 23, 2000 (DE) .......................................... 100 64 910

(51) Int. Cl.[7] .......................... G02B 21/06; G02B 21/00
(52) U.S. Cl. ...................... 359/388; 359/368; 359/385
(58) Field of Search .................................. 359/368–390, 359/618–620, 831–837; 351/208–247; 606/4–17; 358/368–390, 618–620

(56) References Cited

U.S. PATENT DOCUMENTS

| | | | | |
|---|---|---|---|---|
| 5,557,453 A | * | 9/1996 | Schalz et al. ............... | 359/376 |
| 5,601,549 A | * | 2/1997 | Miyagi ........................... | 606/4 |
| 5,835,263 A | * | 11/1998 | Dobschal ..................... | 359/369 |
| 6,081,371 A | * | 6/2000 | Shioda et al. ............... | 359/372 |
| 6,097,538 A | * | 8/2000 | Watanabe et al. ........... | 359/390 |

* cited by examiner

*Primary Examiner*—Thong Q Nguyen
(74) *Attorney, Agent, or Firm*—Foley & Lardner LLP

(57) ABSTRACT

A device for controlling the brightness of an optical signal overlaid on a specimen image includes: a main light source configured to illuminate a specimen with a main light source illumination; a main objective, configured to generate the specimen image in a viewer beam path; and a beam splitter configured to reflect the optical signal into the viewer beam path, where the optical signal is generated by a display, and an illumination of the display is selectable among the main light source illumination, a secondary light source illumination, and both, and where the secondary light source illumination is adjustable as a function of the main light source illumination. The device may be a surgical microscope. The illumination of the display by the main light source illumination may be indirect, where the display is illuminated substantially by light reflections of the main light source illumination from the specimen.

37 Claims, 4 Drawing Sheets

OPTICAL VIEWING DEVICE

CROSS REFERENCE TO RELATED APPLICATIONS

This invention claims priority of the German patent application 100 64 910.6 which is incorporated by reference herein.

FIELD OF THE INVENTION

The invention concerns an optical viewing device in which image data are reflected in, for example a surgical (stereo)microscope.

BACKGROUND OF THE INVENTION

Overlaying of data, or the superimposition of data by means of reflecting-in devices, into the observation field of optical systems is being used more and more in many sectors, since it results in a considerable gain in information for the user. In clinical applications, reflecting-in systems give the surgeon the possibility of receiving further visual information without interrupting his or her visual contact with the surgical field. This is typically done by overlaying additional data onto the microscopic intermediate image, for example by means of a display, imaging optical system, and optical beam splitter.

In almost all applications, the brightness, contrast, and resolution of the overlaid image are important quality features for proper functionality. For good perception of the overlaid information, the image signal that is reflected in must, as a rule, be significantly brighter than the optical image of the specimen seen through the eyepiece.

In reflecting-in devices known at present, the reflected-in image data are presented in the form of an overlay, with simultaneous or alternatingly exclusive depiction of the reflected-in image data in the observation field of a surgical (stereo)microscope. A separate illumination device is usually provided for the display for the reflected-in image. This device can be regulated only if it comprises additional diaphragms with the corresponding control elements, electrical controllers, or the like. If the brightness of the reflected-in image is not controlled, unsatisfactory overlaid images result.

For simultaneous overlaying of the reflected-in image data onto the specimen image, the amount of light required is much greater than the already large amount of light for specimen illumination.

SUMMARY OF THE INVENTION

The inventor has recognized that the known systems are disadvantageous in terms of the following aspects:

i) Because of the high light intensity, very fine detail distinctions in the specimen image are not detected because of the occurrence of flare, reflections, and therefore the obliteration of visual data.

ii) If the reflected-in image data are viewed by a viewer directly, i.e. without the image coming from the specimen, the amount of light used is generally too great and the viewer is dazzled, or the brightness of the illumination for the reflected-in image must be readjusted manually.

iii) In many cases in which a control capability exists, switching between overlay mode and exclusive viewing of the reflected-in image data is implemented only via regulation of the high-intensity main specimen illumination system, which is associated with known disadvantages such as changes in color temperature in the specimen image or the reflected-in image.

iv) All presently known methods for controlling the light intensity of a reflected-in image use a constant intensity over the entire area of the reflected-in image data.

It is therefore an object of the invention to find an improvement which eliminates the aforesaid disadvantages and makes possible undisturbed, continuous viewing of the reflected-in information, independently of I) whether the viewer is viewing exclusively the reflected-in image or the reflected-in image overlaid on the specimen image; and of II) the brightness and contrast of the specimen image.

This object is achieved by a) the utilization of a secondary light source (of lower intensity) for illuminating the reflected-in image data, which can be selectably used with the main light source; and/or b) the use of specimen light reflections for illuminating the reflected-in image data. This invention can also be utilized independently of invention a); and/or c) the use of a portion of the main light source illumination for illuminating the reflected-in image data. This invention can also be utilized independently of inventions a) and b).

A distinction is also made as to whether the reflected-in image data are generated by:

A) a transmitted-light display, for example a liquid crystal display (LCD); or

B) a reflective display, for example a Direct-Drive Image Light Amplifier (D-ILA™) display.

In the steps below, the following improvements can therefore be achieved:

1) The secondary light source allows the reflected-in image data to be adjusted as desired in terms of intensity and color.

2) Because the light of the main light source reflected from the specimen is used (as in invention b) above), it is possible to regulate the brightness of the reflected-in image automatically together with the specimen image brightness.

According to one embodiment of the present invention, the brightness of the reflected-in image data can even be adapted in point fashion (pixel by pixel) as a function of the ambient brightness or contrast of the specimen image. This yields, for the first time, automatic regulation of the brightness of the reflected-in image for every portion (or pixel) of the image. At a dark point on the specimen image, for example, the reflected-in image overlaid there may appear faint.

3) The use of a light amplification system for linear intensity modification over the entire reflected-in image is also possible.

4) The overall result of using one of the above inventions is to eliminate flare, glare, and obliteration of the specimen image.

5) Relative color temperature changes do not occur in either the specimen image or the reflected-in image, since a system for controlling the current intensity of the reflected-in image can be dispensed with.

6) When the method listed under invention a) above is used, it is possible not only to adapt the brightness of the reflected-in image to the particular specimen image brightness, but also to adapt the color; for example, a color contrasting with the particular specimen image may be used for the reflected-in image.

Reference is made in the text above to a surgeon and to a surgical microscope and surgical field, but the invention is not limited thereto; rather it is also open to other users of optical devices with reflected-in images (e.g. projected images with additional information superimposed, video and photographic cameras, monocular and binocular applications).

A preferred embodiment of the present invention provides for a device for controlling the brightness of an optical signal overlaid on a specimen image, comprising: a main light source configured to illuminated a specimen with a main light source illumination; a main objective, configured to generate the specimen image in a viewer beam path; a beam splitter configured to reflect the optical signal into the viewer beam path, wherein the optical signal is generated by a display, and an illumination of the display is selectable among the main light source illumination, a secondary light source illumination and both, wherein the secondary light source illumination is adjustable as a function of the main light source illumination. The device may be a microscope or surgical microscope, and the display may be a transmitted-light display, a reflective display, or a Direct-Drive Image Light Amplifier™ display. The device may include the secondary light source.

In a preferred aspect of the present invention, the illumination of the display by the main light source illumination may be indirect, wherein the display is illuminated substantially by light reflections of the main light source illumination from the specimen. The specimen image may be adjustably imaged on the display via the indirect main light source illumination, and the device may further comprise a diffusion unit configured to reduce a sharpness of the specimen image imaged on the display.

In another aspect, the device may further comprise one of an additional light source and an electronically controlled residual light amplifier configured to amplify the brightness of the indirect main light source illumination.

In another aspect, the illumination of the display may be selectable among a direct main light source illumination and an indirect main light source illumination, and wherein, in the indirect main light source illumination, the display is illuminated substantially by light reflections of the main light source illumination from the specimen.

In another aspect, the device may further comprise one of an optical prism and a mirror configured to select the illumination for the display from among the main light source illumination, the secondary light source illumination, and both. It may also comprise a beam splitter configured to reflect a portion of the main light source illumination into a display illumination beam path.

In another aspect, a brightness of the secondary light source illumination may be electronically adjustable or adjustable in mechanical overwritable fashion. It may be adjusted to substantially correspond to a brightness of the specimen image, or a brightness of the secondary light source illumination may be adjustable so that each pixel of the optical signal substantially corresponds to a brightness of a corresponding pixel of the specimen image.

In another aspect, a brightness of the specimen image is adjustable by one of a shutter and a diaphragm.

In another aspect, a light wavelength of the secondary light source illumination may be adjustable. The light wavelength may be adjusted to contrast with a light wavelength of the specimen image, or the light wavelength may be adjustable so that each pixel of the optical signal contrasts with a light wavelength of a corresponding pixel of the specimen image.

Another preferred embodiment of the present invention provides for a device for controlling the brightness of an optical signal overlaid on a specimen image, comprising: a main light source configured to illuminate a specimen with a main light source illumination; a main objective, configured to generate the specimen image in a viewer beam path; a beam splitter configured to reflect the optical signal into viewer beam path; wherein the optical signal is generated by a display, and the main light source is configured to illuminate the display with an indirect main light source illumination, wherein the display is illuminated substantially by light reflections of the main light source illumination from the specimen.

In a preferred aspect of the present invention, the illumination of the display may be selectable among a direct main light source illumination and the indirect main light source illumination. Further, the illumination of the display may be selectable among a main light source illumination and a secondary light source illumination, and the secondary light source illumination may be adjustable as a function of the main light source illumination.

In another aspect, the device may further comprise a beam splitter configured to reflect a portion of the specimen image into a display illumination beam path.

DETAILED DESCRIPTION OF THE INVENTION

Figure 1:
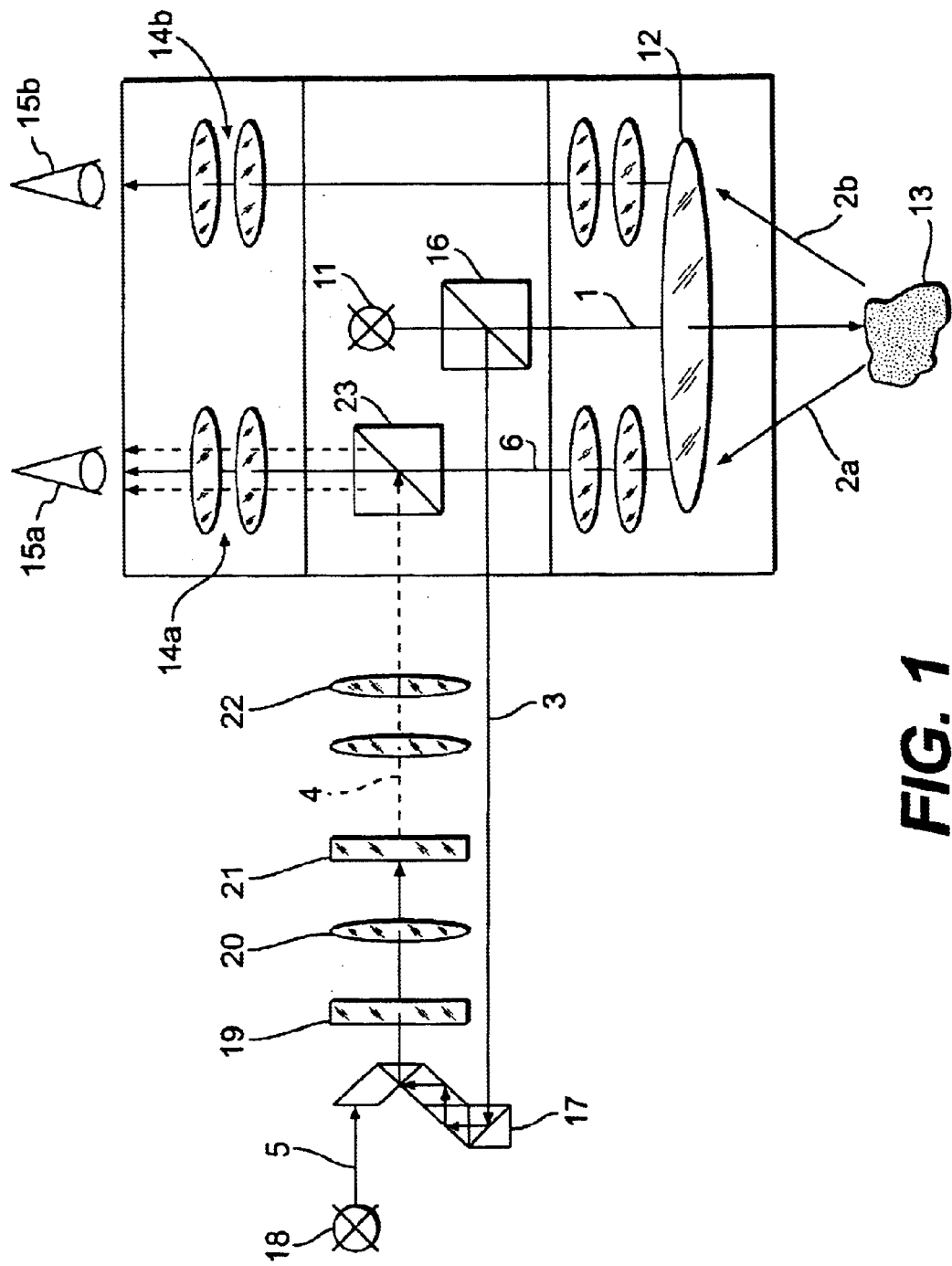
FIG. 1 is a schematic drawing of one embodiment of the present invention in which the reflected-in image is illuminated by the main light source via a transmitted-light display.

FIG. 1 symbolically shows a main (illuminating) beam path 1, a specimen reflection path 2a, 2b, a viewer beam path 6, and a display illumination beam path 3 for a reflected-in image (or optical signal), proceeding from a main light source 11 via a beam splitter 16 to a deflection unit 17, for example a (tiltable, pivotable, switchable, or rotatable) prism or mirror. According to the present invention, a secondary light source or reflected-in image illuminator 18 (preferably controllable as to brightness and color temperature), a transmitted-light display 21, and the resulting reflected-in image beam path 4 are depicted; the latter is in turn superimposed via a beam splitter 23 into the viewer path 6 for observation. Eyepiece optical system 14a, 14b focuses both the reflected-in image and the specimen image onto the eye(s) of viewer 15a, 15b. The light of main light source 11 or the light of reflected-in image illuminator 18 can thus be used selectably to illuminated display 21. The deflection unit 17 (e.g., prism) allows a selection between two light sources (main light source 11 and secondary light source/reflected-in image illuminator 18) with no movement of the light sources. The reflected-in image illuminator 18 may comprise light-emitting diodes (LED's).

Figure 2:
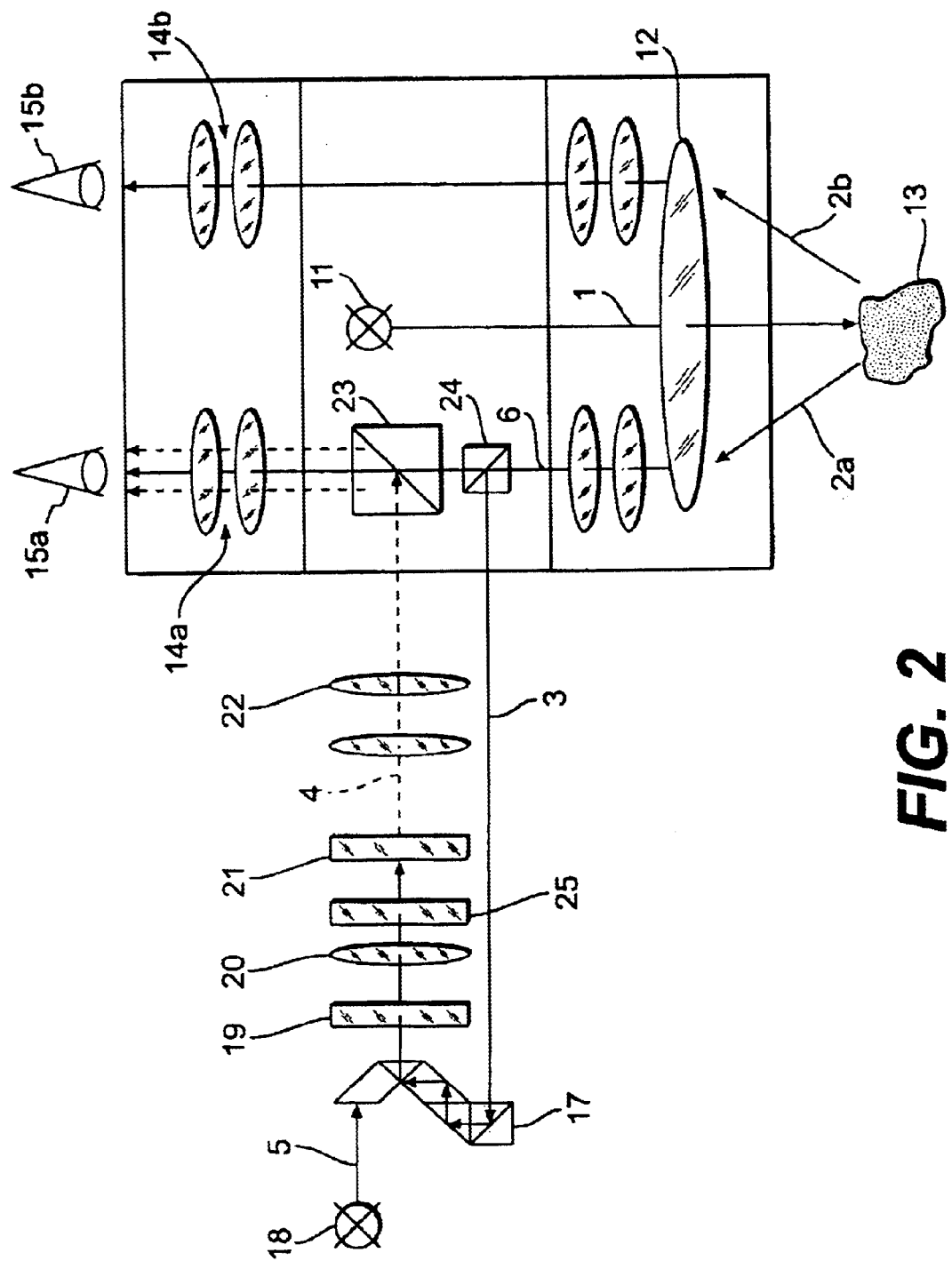
FIG. 2 is a schematic drawing of one embodiment of the present invention in which the reflected-in image is illuminated by light reflections from the specimen via a transmitted-light display.

FIG. 2 shows, according to the present invention, the use of light reflected from the specimen 13 along specimen reflection beam path 2a and viewer beam path 6 as illumination for transmitted-light display 21. Viewer beam path 6 is divided by way of a beam splitter 24 into an display illumination beam path 3 for the reflected-in image and viewer beam path 6. In other words, beam splitter 24 is configured to reflect a portion of the specimen image from the viewer beam path 6 into the display illumination beam path 3. According to a particular embodiment of the invention, the image of specimen 13 is then imaged at least approximately on display 21 in order to optimize the pixel brightness of the display illumination.

Figure 3A:
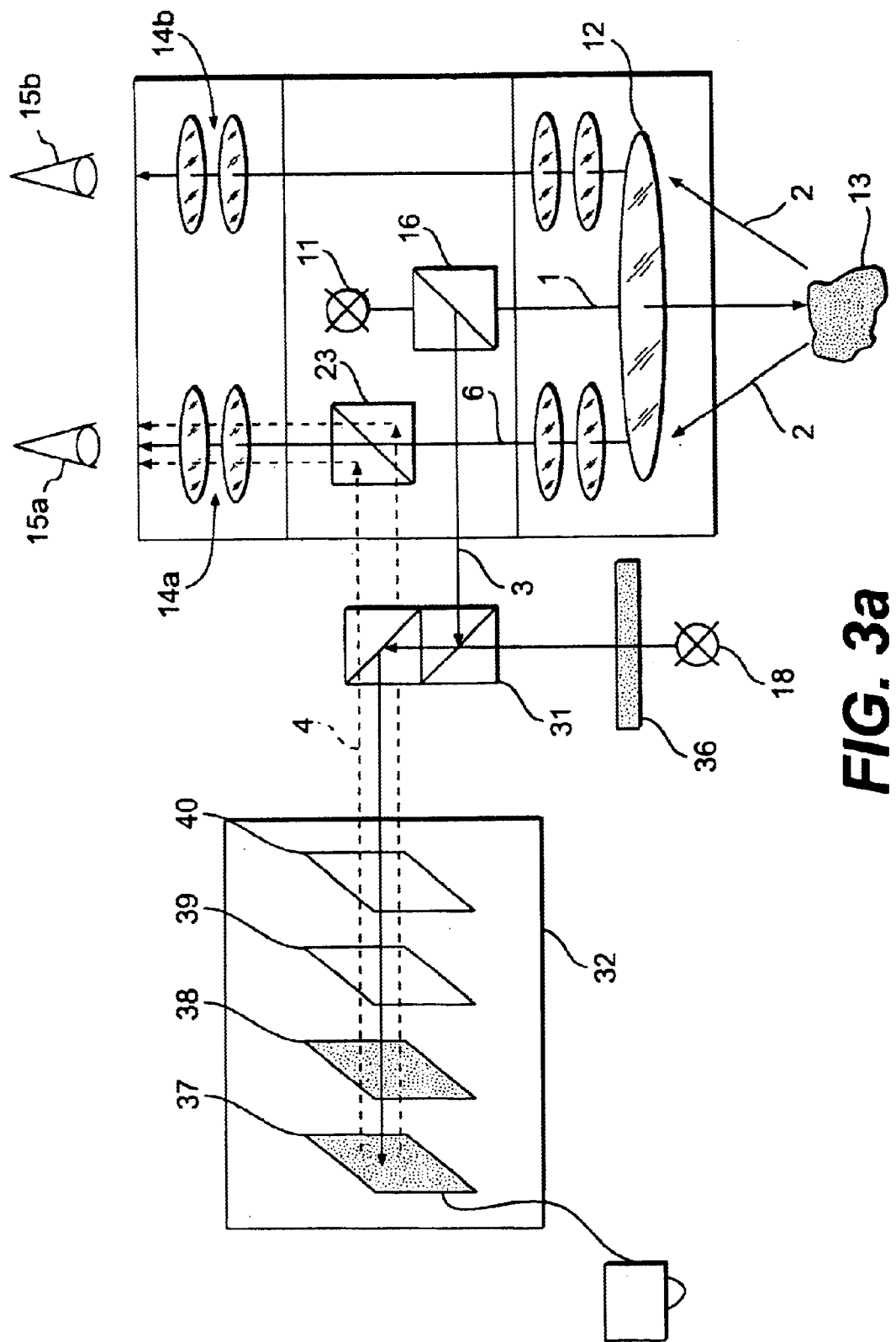
FIG. 3a is a schematic drawing of one embodiment of the present invention in which the reflected-in image is illuminated by the main light source via a reflective display.

FIG. 3a shows, according to the present invention, the use of a reflective display 32 (i.e., reflected-light or incident-light display), for example a D-ILA™, utilizing display illumination beam path 3 for the reflected-in image via a deflection unit 31, for example a prism or mirror. Alternatively, light from the main light source 11 could be directed via beam splitter 16 directly onto the incident-light display 32, so that deflection unit 31 is eliminated. Furthermore, a reflected-in image illuminator 18 can be provided that sends light, in addition or alternatively to the main light source 11, onto incident-light display 32.

Figure 3B:
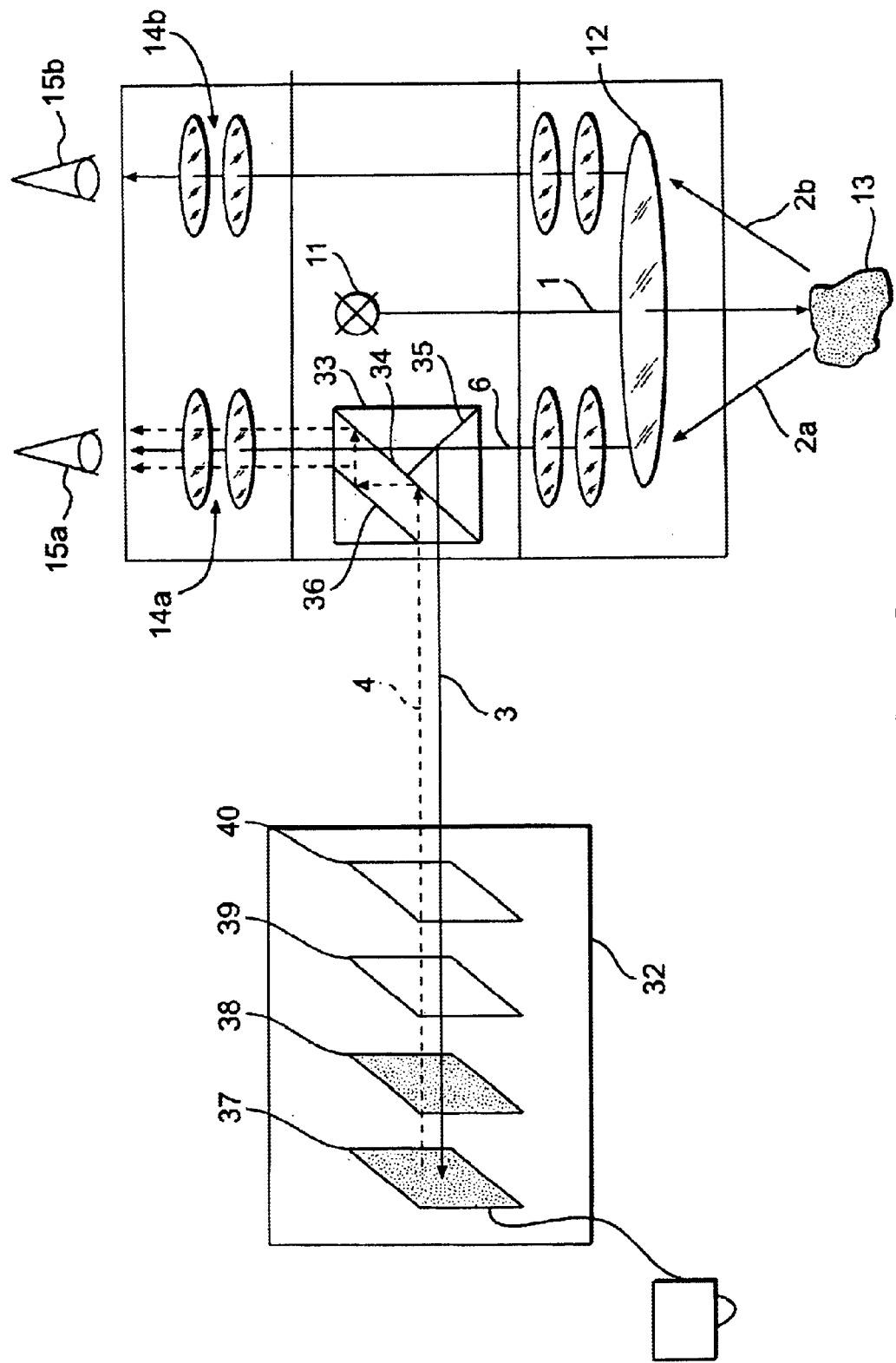
FIG. 3b is a schematic drawing of one embodiment of the present invention in which the reflected-in image is illuminated by light reflections from the specimen via a reflective display.

FIG. 3b shows, according to the present invention, the use of a reflected-light or incident-light display 32 that uses reflected specimen light as the illumination source. If specimen 13 is imaged at least approximately on the display 32, this results in pixel-scale illumination control. It is understood as self-evident that specimen reflection beam path 2b can comprise a built-in beam splitter, a diaphragm, or the like (not shown) in order to keep the light intensity of the specimen image at the same level as in specimen reflection beam path 2a, which intersects with viewer beam path 6, which has a prism 23 (FIGS. 1, 2, 3a) or 33 (FIG. 3b).

In both FIG. 3a and FIG. 3b, reflection of the reflected-in image (or optical signal) into viewer beam path 6 is accomplished via a splitter prism 23 or 33, respectively.

In FIG. 1, a portion of the light proceeding from main light source 11 is deflected by beam splitter 16 onto tiltable deflection unit 17, for example a prism, mirror, or the like, and onto transmitted-light display 21 (e.g., LCD). The image produced on display 21 is overlaid on viewer beam path 6 using a beam splitter 23. According to the present invention, a second light source (or reflected-in image illuminator) 18, to be used separately for the reflected-in image, can be used to illuminate display 21 via a secondary illumination beam path 5; this makes possible control of the brightness and/or color temperature of the reflected-in image independently of main light source 11.

In FIG. 2, instead of main light source 11, light is reflected from specimen 13 into specimen reflection beam path 2a and viewer beam path 6, and directed by a splitter prism 24 onto deflection unit 17, and is used for illumination of the display 21. The basic brightness can be reduced by means of a superimposition shutter 19 (e.g., a diaphragm); the sharpness of the reflected-in image can be reduced by means of a diffusion unit 25, for example a diffusion disk. According to the present invention, by means of this arrangement it is possible to dispense with control systems for measuring and controlling the brightness of portions of the reflected-in image, since the light reflected from the specimen 13 assumes this function. Combinations of reflected light (from the specimen 13) and a secondary light source 18 are within the context of the invention as variants.

In FIGS. 3a and 3b, according to an independent invention, instead of transmitted-light display 21 depicted in FIGS. 1 and 2, a reflective display 32, which is illuminated either by main light source 11 via a beam splitter 16 and a deflection unit 31 (FIG. 3a) or by light reflected from specimen 13 via a deflection prism 33 (FIG. 3b), is used. In the latter case, the image is reflected in at reflective surfaces 34 and 36 in deflection prism 33. This arrangement is particularly suitable especially because of its brightness. It can also be used independently of the other features described.

PARTS LIST

1 Main (illumination) beam path
2 Specimen reflection beam path
3 Display illuminating beam path
4 Reflected-in image beam path
5 Secondary illumination beam path
6 Viewer beam path
11 Main light source
12 Main objective
13 Specimen
14 Eyepiece optical system
15 Viewer
16 Illumination beam splitter for main light source
17 Deflection unit
18 Secondary light source for reflected-in image illuminator
19 Superimposition shutter (diaphragm)
20 Display optical system
21 Transmitted-light display
22 Optical system for reflected-in image
23 Beam splitter for superimposing reflected-in image
24 Illumination beam splitter for reflected specimen light
25 Diffusion unit
31 Deflection unit for reflected-in image illumination
32 Reflective display
33 Deflection prism for reflected-in image illumination and for reflecting image into viewer beam path
34 Reflective surface for reflected-in image
35 Splitter surface for reflected specimen light
36 Reflective surface for reflected-in image
37 Reflective pixel electrode (signal/driver IC/polarized layer)
38 Liquid crystal layer
39 Transparent electrode
40 Glass

What is claimed is:

1. A device for controlling the brightness of an optical signal overlaid on a specimen image, having a main beam path (1, 2, 6), a main objective (12), a main light source (11), and a beam splitter (23) for reflecting image data into the main beam path (6), wherein the illumination for the reflected-in image (4) is generated on a transmitted-light basis, a transmitted-light display (21), selectably directly or indirectly by way of the main light source (11) and/or a second light source (18) controllable as a function of the main light source.

2. The device as defined in claim 1, wherein the illumination for the reflected-in image can be generated selectably by the main light source (112) or by the light reflections of the main light source (2) from the specimen.

3. The device as defined in claim 1, wherein a deflection unit (17) is provided for switching between the main light source and reflected-in image light source.

4. The device as defined in claim 1, wherein the beam path of the main light source (11) is divided by a beam splitter into a reflected-in image beam path (3) and a specimen illumination beam path (1).

5. The device as defined in claim 1, wherein the light wavelength of the reflected-in image light source (18) is adjustable.

6. The device as defined in claim 1, wherein the brightness of the reflected-in image is controllable by a shutter (19) and/or a diaphragm.

7. The device as defined in claim 1, wherein a controllable portion of the reflected specimen light can be directed via a separate beam path (3) onto the transmitted-light display or incident-light display, and the specimen can be imaged thereon.

8. The device as defined in claim 7, wherein the specimen image on the display is adjustable; and/or a diffusion disk (25) is arranged on the side of the transmitted-light display facing the specimen.

9. The device as defined in claim 7, wherein an additional light source (18) can be superimposed into the display illumination beam path.

10. A device for controlling the brightness of an optical signal overlaid on a specimen image, having a main beam path (1, 2, 6), a main objective (12), a main light source (11), and a beam splitter (23) for reflecting image data into the main beam path (6), wherein the illumination for the reflected-in image (4) is generated on a transmitted-light basis, by a reflective display (32) or an incident-light display.

11. A device for controlling the brightness of an optical signal overlaid on a specimen image, comprising:
a main light source configured to illuminate a specimen with a main light source illumination;
a main objective, configured to generate the specimen image in a viewer beam path; and
a beam splitter configured to reflect the optical signal into the viewer beam path,
wherein the optical signal is generated by a display, and an illumination of the display is selectable among the main light source illumination, a secondary light source illumination, and both, and
wherein the secondary light source illumination is adjustable as a function of the main light source illumination.

12. The device as in claim 11, wherein the device is a microscope.

13. The device as in claim 11, wherein the display is a transmitted-light display.

14. The device as in claim 11, wherein the display is a reflective display.

15. The device as in claim 11, wherein the display is a Direct-Drive Image Light Amplifier™ display.

16. The device as in claim 11, wherein the illumination of the display by the main light source illumination is indirect, wherein the display is illuminated substantially by light reflections of the main light source illumination from the specimen.

17. The device as in claim 16, wherein the specimen image is imaged on the display via the indirect main light source illumination.

18. The device as in claim 17, wherein the specimen image imaged on the display is adjustable.

19. The device as in claim 17, further comprising a diffusion unit configured to reduce a sharpness of the specimen image imaged on the display.

20. The device as in claim 11, wherein the illumination of the display is selectable among a direct main light source illumination and an indirect main light source illumination, and wherein, in the indirect main light source illumination, the display is illuminated substantially by light reflections of the main light source illumination from the specimen.

21. The device as in claim 11, further comprising one of an optical prism and a mirror configured to select the illumination for the display from among the main light source illumination, the secondary light source illumination, and both.

22. The device as in claim 11, further comprising a beam splitter configured to reflect a portion of the main light source illumination into a display illumination beam path.

23. The device as in claim 11, wherein a brightness of the secondary light source illumination is electronically adjustable.

24. The device as in claim 11, wherein a brightness of the secondary light source illumination is adjusted to substantially correspond to a brightness of the specimen image.

25. The device as in claim 11, wherein a brightness of the secondary light source illumination is adjustable so that each pixel of the optical signal substantially corresponds to a brightness of a corresponding pixel of the specimen image.

26. The device as in claim 11, wherein a brightness of the secondary light source illumination is adjustable in mechanically overwritable fashion.

27. The device as in claim 11, wherein a brightness of the specimen image is adjustable by one of a shutter and a diaphragm.

28. The device as in claim 11, wherein a light wavelength of the secondary light source illumination is adjustable.

29. The device as in claim 11, wherein a light wavelength of the secondary light source illumination is adjusted to contrast with a light wavelength of the specimen image.

30. The device as in claim 11, wherein a light wavelength of the secondary light source illumination is adjustable so that each pixel of the optical signal contrasts with a light wavelength of a corresponding pixel of the specimen image.

31. The device as in claim 11, further comprising a secondary light source to generate the secondary light source illumination.

32. The device as in claim 11, wherein the device is a surgical microscope.

33. A device for controlling the brightness of an optical signal overlaid on a specimen image, comprising:
a main light source configured to illuminate a specimen with a main light source illumination;
a main objective, configured to generate the specimen image in a viewer beam path; and
a beam splitter configured to reflect the optical signal into the viewer beam path,
wherein the optical signal is generated by a display, and the main light source is configured to illuminate the display with an indirect main light source illumination, and
wherein the display is illuminated substantially by light reflections of the main light source illumination from the specimen.

34. The device as in claim 33, further comprising a beam splitter configured to reflect a portion of the specimen image into a display illumination beam path.

35. A device for controlling the brightness of an optical signal overlaid on a specimen image, comprising:
a main light source configured to illuminate a specimen with a main light source illumination;
a main objective, configured to generate the specimen image in a viewer beam path; and a beam splitter configured to reflect the optical signal into the viewer beam path, wherein the optical signal is generated by a display, and the main light source is configured to illuminate the display selectably by a direct main light source illumination and the indirect main light source illumination.

36. A device for controlling the brightness of an optical signal overlaid on a specimen image, comprising:

a main light source configured to illuminate a specimen with a main light source illumination;

a main objective, configured to generate the specimen image in a viewer beam path; and a beam splitter configured to reflect the optical signal into the viewer beam path, wherein the optical signal is generated by a display, and the display is illuminated selectably by a main light source illumination and a secondary light source illumination.

37. The device as in claim 36, wherein the secondary light source illumination is adjustable as a function of the main light source illumination.

* * * * *